United States Patent [19]

Tuchman

[11] Patent Number: 4,633,906
[45] Date of Patent: Jan. 6, 1987

[54] MIXING CARTRIDGE FOR HOT AND COLD WATER FAUCETS

[75] Inventor: Michael Tuchman, Holon, Israel

[73] Assignee: Hamat Koor Metals Ltd., Holon, Israel

[21] Appl. No.: 809,304

[22] Filed: Dec. 16, 1985

[30] Foreign Application Priority Data

Dec. 25, 1984 [IL] Israel .................................. 73930

[51] Int. Cl.⁴ .......................................... F16K 11/078
[52] U.S. Cl. .............................. 137/625.17; 137/625.4; 251/287; 251/174
[58] Field of Search ........... 137/625.17, 625.4, 625.41; 251/286, 287, 174

[56] References Cited

U.S. PATENT DOCUMENTS

| | | | |
|---|---|---|---|
| 3,023,769 | 3/1962 | Williams | 137/625.17 X |
| 3,023,784 | 3/1962 | Monson | 137/625.17 |
| 3,384,119 | 5/1968 | Manoogian | 137/625.17 |
| 3,965,936 | 6/1976 | Lyon | 137/625.17 |
| 4,325,403 | 4/1982 | Uhlmann | 137/625.17 X |
| 4,362,186 | 12/1982 | Parkison et al. | 137/625.17 |
| 4,375,225 | 3/1983 | Andersson | 137/625.17 |

Primary Examiner—Alan Cohan
Assistant Examiner—John A. Rivell
Attorney, Agent, or Firm—Benjamin J. Barish

[57] ABSTRACT

A self-contained, unitary mixing cartridge for use in hot and cold water faucets for manually selecting the mixture-proportions and flow-rates of water supplied from separate hot water and cold water inlets to a common outlet, comprises an outer housing, an inner housing, a lever pivotably mounted in the inner housing and having an outer end projecting through the top wall of the outer housing for coupling to the faucet handle, and a slide valve within the inner housing and coupled to the inner end of the lever. The slide-valve is formed with a first passageway cooperable with two bushings at the two inlets, and a second passageway cooperable with the outlet, such that rotating the handle in the circumferential direction controls the mixture-proportions and thereby the temperature of the water entering the first passageway from the two inlets and passing therefrom via the second passageway to the common outlet; whereas pivoting the handle in the vertical direction controls the flow-rate of the water passing via the first passageway and second passageway to the common outlet.

15 Claims, 8 Drawing Figures

MIXING CARTRIDGE FOR HOT AND COLD WATER FAUCETS

BACKGROUND OF THE INVENTION

The present invention relates to faucets and particularly to a mixing cartridge for hot and cold water faucets for manually selecting the mixture-proportions and flow-rates of water supplied from separate hot and cold water inlets.

A number of such mixing faucets have been developed and are now in use. Some of these faucets include ceramic discs rotatable relative to each other to select the mixture-proportions and flow-rates; such discs are very expensive to manufacture, and therefore the cost for the mixing faucets is relatively high. In other known mixing faucets, it is necessary first to move the control member in one direction to open the faucet, and then in another direction to select the mixture-proportions; the faucet is therefore not retained in a preselected mixture-proportion when it is turned off and then turned on. Other known mixing faucets are of complicated construction and therefore expensive to manufacture and assemble.

SUMMARY OF THE INVENTION

An object of the present invention is to provide a mixing faucet having advantages in the above respects. More particularly, an object of the invention is to provide a self-contained, unitary mixing cartridge for hot and cold water faucets which obviates the need for ceramic discs and thereby enables the faucet to be produced at low cost. Another object of the invention is to provide a cartridge which permits adjustment of mixture-proportions and flow-rates independently of each other. A further object is to provide a self-contained, unitary mixing cartridge which includes a few simple parts that can be assembled at low cost and which permits quick and convenient replacement in a faucet with a minimum of skill and time.

According to a broad aspect of the present invention, there is provided a self-contained, unitary mixing cartridge for use in hot and cold water faucets for manually selecting mixture-proportions and flow-rates of water supplied from separate hot water and cold water inlets, comprising: an outer housing closed at one end by a top wall formed with a central opening; a base plate, closing the opposite end of the outer housing and having a cold water inlet, a hot water inlet adjacent to the cold water inlet, and a common outlet; an inner housing rotatably mounted within the outer housing; a lever pivotably mounted at an intermediate point to the inner housing and projecting through said opening in the outer housing for coupling to a handle of the faucet; a slide-valve within the inner housing and coupled to the inner end of the lever; a first annular sealing ring between the inner housing and the outer housing; and a second annular sealing ring between the inner housing and the slide valve. The cold and hot water inlets includes annular recesses; and a bushing seal is received in each of the annular recesses and is spring-urged into contact with the slide-valve. The slide-valve is formed with a first passageway cooperable with the two bushing seals of the two inlets, and a second passageway cooperable with the outlet.

The arrangement is such that rotating the handle in the circumferential direction rotates the inner housing and the slide-valve to move the first passageway so as to vary the portion thereof in alignment with each of the two bushing seals, to control the mixture proportions and thereby the temperature of the water entering the first passageway from the two inlets and passing therefrom via the second passageway to the common outlet; whereas pivoting the handle in the vertical direction moves the slide-valve diammetically of the housing to vary the portion of the first passageway in alignment with either of the two bushings and thereby to control the flow-rate of the water passing via the first passageway and second passageway to the common outlet.

It will thus be seen that the mixing cartridge is of a self-contained, unitary construction, which includes its own seals and which permits quick and convenient replacement in a faucet with a minimum of skill and time by merely slipping-off the handle, removing the defective cartridge, substituting a new cartridge, and then re-applying the handle.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
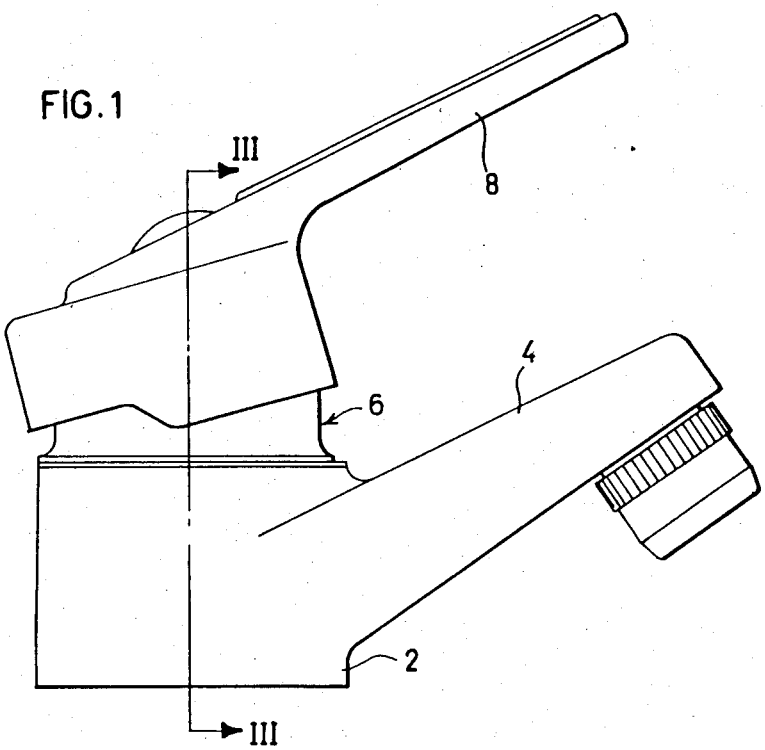
FIG. 1 is a side elevational view illustrating one form of single-handle faucet including a mixing cartridge in accordance with the present invention.

The single-handed faucet illustrated in FIG. 1 is particularly for use in a kitchen sink or the like for controlling the mixture-proportions and flow-rates of water supplied to the user. The faucet thus includes a fitting 2 at one end for connection to the hot water and cold water pipes, and a spout 4 through which the water is outletted. The mixture-proportions and flow-rates of the water outletted via spout 4 are controlled by a mixing device, generally designated 6, having a handle 8 which is rotatable circumferentially of the faucet for controlling the mixture-proportions, and is pivotable vertically for controlling the flow-rate. Thus, in the normal position of handle 8, the water is turned off, and in order to turn it on, the handle is pressed up according to the flow-rate desired. Before or after the handle is pressed up for determining the flow-rate, it may be moved circumferentially to determine the mixture-proportions of hot water relative to cold water outputted from spout 4.

Figure 3:
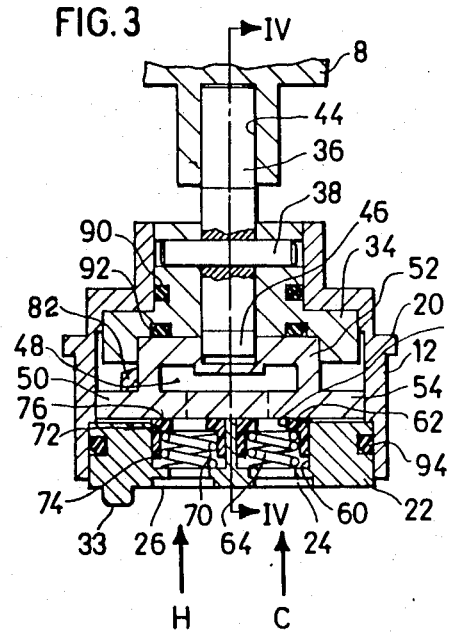
FIG. 3 is a sectional view along lines III—III of FIG. 1.
Figure 2:
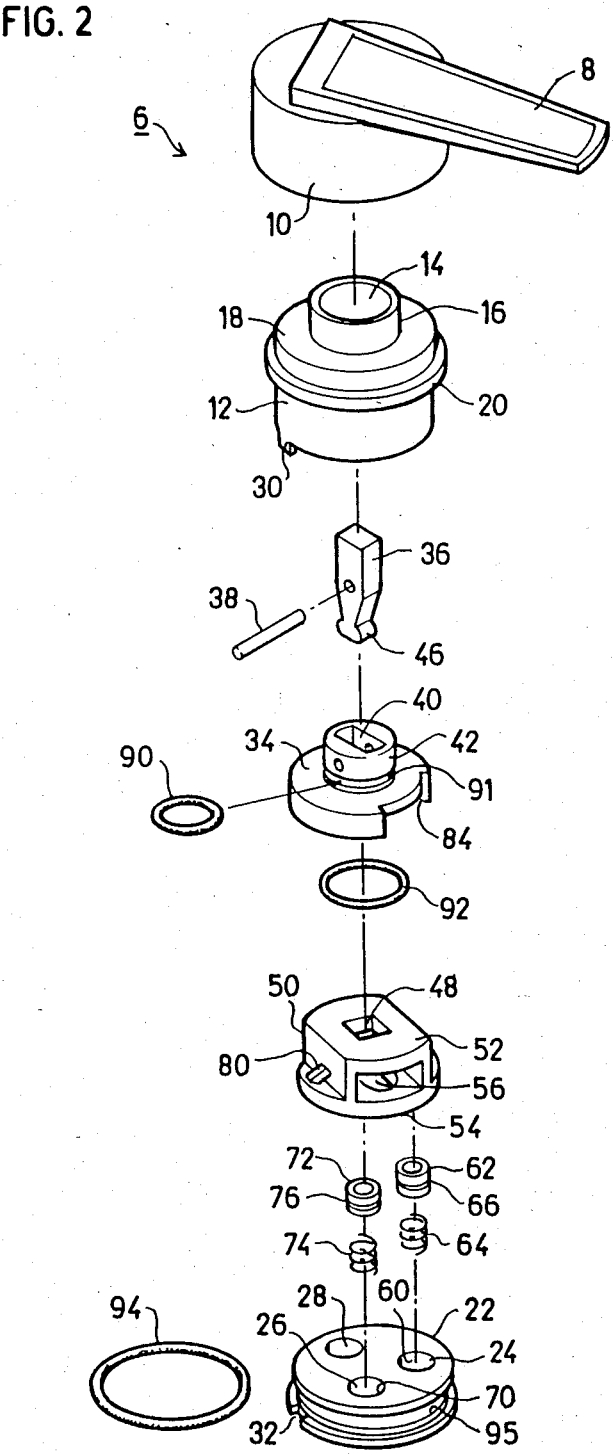
FIG. 2 is an exploded perspective view illustrating the main components of the mixing cartridge in the faucet of FIG. 1.

The mixing device 6 is in the form of a self-contained, unitary cartridge which can be applied to many different types of faucets or taps having various configurations and arrangements of spouts. The construction of mixing cartridge 6 is more particularly illustrated in FIGS. 2-4 of the drawings, and its mode of operation is more particularly illustrated in FIGS. 5a-5d.

Mixing cartridge 6 thus includes, in addition to handle 8, a collar 10 (FIG. 2) rotatably received on a housing 12 formed with a central opening 14 defined by an annular stem 16 projecting from the top wall 18 of the housing. Housing 12 further includes an annular flange 20 for mounting the mixing cartridge, and is closed at its bottom by a base plate 22 formed with the inlet and outlet openings. Thus, at one side of base plate 22 there is formed a cold water inlet 24 connectable to the cold water pipe, and a hot water inlet 26 connectable to the hot water pipe and disposed in close side-by-side relationship to the cold water inlet 24. The opposite side of base plate 22 includes a common outlet 28 communicating with spout 4 of the faucet.

Base plate 22 is fixed to the outer housing 12 by one or more lugs 30 projecting from the bottom of the housing and receivable within recesses 32 formed in the base plate. The bottom of base plate 22 is formed with a locating pin 33 (FIG. 3) for properly locating the mixing cartridge 6 when placed within the faucet.

Disposed within the outer housing 12 is an inner housing 34 carrying a lever 36 pivotably mounted by a pin 38 passing through an intermediate point of the lever. Lever 36 is received within a rectangular opening 40 formed through a stem 42 projecting from the upper face of the inner housing 34. Lever 36 is of substantially rectangular section so as to be freely pivotable within rectangular opening 40. The upper end of lever 36 passes through opening 14 of the outer housing 12 and is received within a socket 44 (FIGS. 3, 4) formed in handle 8. The inner end of lever 36 is formed with an enlarged rounded head 46 pivotably received within a socket 48 in the upper face of a slide-valve 50. The arrangement is such that pressing handle 8 upwardly or downwardly pivots lever 36 and moves slide-valve 50 in the diametrical direction with respect to housing 12; whereas rotating handle 8 rotates lever 36, and thereby lever housing 34 and slide-valve 50, in the circumferential direction with respect to housing 12.

More particularly, slide-valve 50 includes an inner wall 52 formed with the rectangular opening 48 receiving the inner end of lever 36, and an outer wall 54 spaced from the inner wall. Outer wall 54 is formed with a first passageway 56 (FIGS. 5a–5d) of a configuration approximately that of a heart or shield and is substantially centrally of the outer wall, and a second passageway 58, of approximately semi-elliptical configuration at one side of the outer wall.

Figure 4:
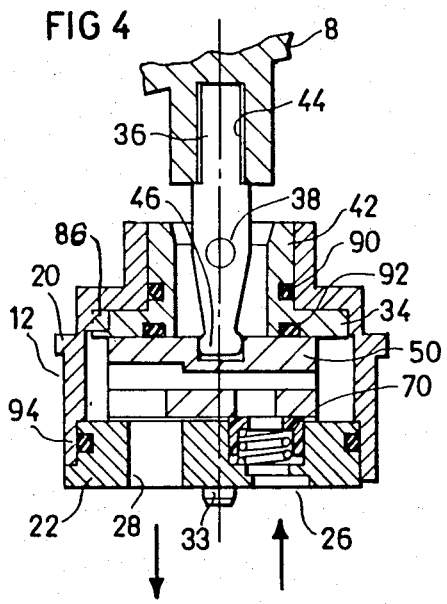
FIG. 4 is a sectional view along lines IV—IV of FIG. 3.

The outlet opening 28 through base plate 22 is a bore of uniform diameter, as shown particularly in FIG. 4. However, the two inlet openings 24 and 26 are each formed with an annular recess circumscribing the respective opening for receiving a bushing spring-urged against the face of the outer wall 54 of slide-valve 50. Thus, cold water inlet 24 is circumscribed by an annular recess 60 (FIG. 3) receiving a bushing seal 62 and a coil spring 64 bearing against an annular rib 66 formed on bushing 62 to urge same outwardly of the recess into engagement with the face of wall 54 of the slide-valve. Similarly, the hot water inlet 26 is formed with an annular recess 70 for receiving a bushing seal 72 and a coiled spring 74 bearing against an annular rib 76 for urging the bushing into engagement with the slide-valve wall 54.

Figure 5A:
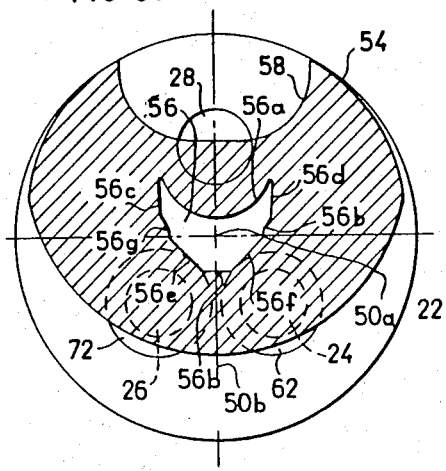
FIGS. 5a-5d illustrate four conditions of the mixing cartridge in the faucet of FIG. 1.
Figure 5B:
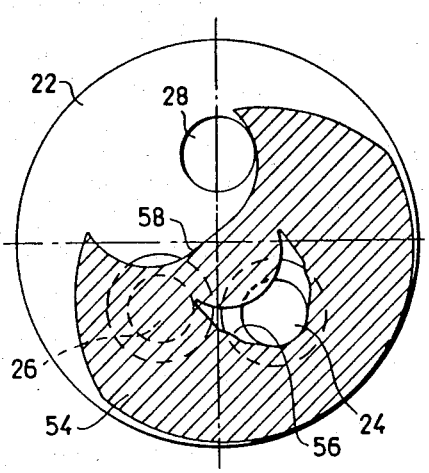
Figure 5C:
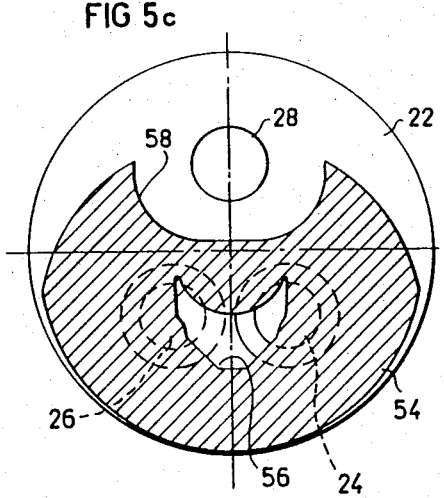

FIGS. 5a and 5c illustrate slide-valve wall 54 when the valve is in its fully-closed and fully-open condition, respectively, and positioned to provide equal proportions of hot water and cold water.

Wall 54 is rotatable about a center of rotation 50a, and is symmetrical about a central axis 50b passing through its center of rotation 50a. The inner edge 56a of passageway 56 is of arcuate configuration having its center of radius on the central axis of symmetry 50b of slide-valve wall 54. The outer edge 56b of passageway 56 is a fraction of the length of edge 56a and is of straight line configuration, extending perpendicular to the axis of symmetry 50b of wall 54. Side edges 56c, 56d extend in straight parallel lines from the inner edge 56a in a direction substantially perpendicular to the outer edge 56b; and side edges 56e, 56f extend at angles approximately 135° from the outer edge 56b but terminate short of their inner sections, with side edges 56c, 56d, being joined to the side edges by slightly concave edges 56g, 56h.

It has been found that with this configuration of passageway 56, approximating that of a heart or a shield, the rotation of slide-valve 50 produces a substantially uniform variation in the outletted mixture from all cold water (FIG. 5b), to equal amounts of cold and hot water (FIG. 5c), and finally to all hot water (FIG. 5d) under all flow rates of the faucet.

As indicated earlier, the inner housing 34 and slide-valve 50 are assembled within the outer housing 12, and the outer housing is closed by base plate 22 so as to constitute a self-contained, unitary cartridge which can be used with different types of faucets. To assure that the slide-valve 50 is properly positioned within this assembly, its lower wall 54 is formed with a rib 80 (FIG. 2) on one side, and the inner housing 34 is formed with a similar rib 82 (FIG. 3) on the opposite side; these two ribs are located so as to engage each other if slide-valve 50 is inserted into the wrong side of the inner housing 34, but not to engage each other when the slide valve is inserted in the proper side of the housing.

In addition, the inner housing 34 is formed with a slot 84 (FIG. 2) extending for a part of the circumference of the housing, into which slot is received a tooth 86 (FIG. 4) projecting inwardly of the inner face of the outer housing 12. Tooth 86 thereby limits the rotation of the inner housing 34 to a partial revolution according to the length of slot 84.

The mixing cartridge further includes three annular sealing rings, namely ring 90 received within annular recess 91 formed in stem 42 of the inner housing 34 for sealing the inner housing with respect to the outer housing 12, ring 92 received with an annular recess formed in the underface of inner housing 34 for sealing the inner housing with respect to the slide valve 50, and ring 94 received within an annular recess 95 formed in the base plate 22 for sealing it with respect to the side wall of the outer housing 12.

The operation of the illustrated mixing battery 6 will now be described particularly with reference to FIGS. 5a–5d illustrating the position of wall 54 of slide-valve 50 during the various manipulations of handle 8.

Figure 5D:
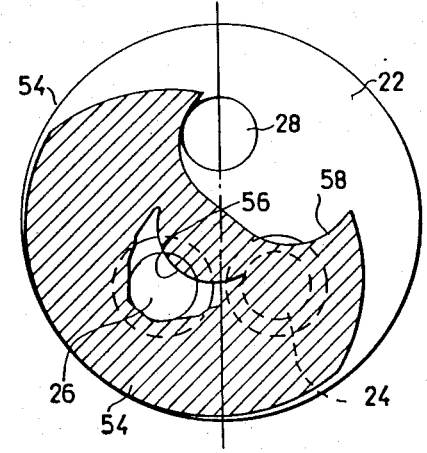

Thus, FIG. 5a illustrates the normal, fully closed position of the mixing cartridge, wherein passageway 56 is located inwardly of the bushings 62 and 72 of both the cold water inlet 24 and the hot water inlet 26, and therefore no water will flow to the outlet opening 28 even though a part of that opening is exposed by passageway 58 of the slide-valve wall 54. If it is desired to outlet only cold water, handle 8 is rotated counterclockwise and is pivoted upwardly, to the position illustrated in FIG. 5b, whereupon only cold water from inlet 24 passes through passageway 56 to the outlet opening 28. If it is desired to outlet an equal mixture of hot and cold water, handle 8 is rotated clockwise (from the position of FIG. 5b), and is pivoted upwardly so as to bring substantially equal portions of passageway 56 into alignment with both the cold water inlet bushing 62 and hot water inlet bushing 72 (FIG. 5c). If it is desired to output only hot water, handle is rotated further clockwise and pivoted upwardly in order to bring passageway 56 into alignment only with the hot water inlet bushing 72, as shown in FIG. 5d, so that only hot water will be outputted to the outlet opening 28.

It will be appreciated that handle 8 can be preset in any selected rotational position so as to preset the mixture-proportion according to that desired, and then a handle can be pivoted upwardly in order to turn the faucet on and also to control the flow-rate of the water outletted from the faucet. Thus, once a desired mixture has been determined, the handle can be left in that particular rotary position and pressed upwardly only when it is desired to outlet water of that particular mixture, the extent of the upward movement of the handle determining the flow-rate of the water so outputted.

Appreciated that the described self-contained, unitary cartridge includes its own seals with respect to the inner housing 34 and the outer housing 12, namely seal 90, and with respect to the inner housing and the slide valve 50, namely, seal 92, so that if any element of the cartridge or its seals is defective, the complete cartridge may be quickly and simply replaced with a minimum of time and skill, by merely detaching handle 8 and its collar 10, removing the defective cartridge, replacing it with a new one, and then re-applying the handle.

Another advantage of the disclosed mixing cartridge is that there is no possibility of flow between the hot an cold water pipes in the closed condition of the faucet.

While the invention has been described with respect to one preferred embodiment, it will be appreciated that many other variations, modifications and applications of the invention may be made.

What is claimed is:

1. A self-contained, unitary mixing cartridge for use in hot and cold water faucets for manually selecting the mixture-proportions and flow-rates of water supplied from separate hot water and cold water inlets, comprising:

an outer housing closed at one end by a top wall formed with a central opening;
   a base plate closing the opposite end of said outer housing and having a cold water inlet, a hot water inlet adjacent to said cold water inlet, and a common outlet;
   an inner housing rotatably mounted within said housing;
   a lever pivotably mounted at an intermediate point to said inner housing and having an outer end projecting through said opening in said top wall of the outer housing for coupling to a handle of the faucet;
   a slide-valve within said inner housing and coupled to the inner end of said lever;
   a first annular sealing ring between said inner housing and said outer housing;
   a second annular ring between said inner housing and said slide-valve;
   said cold and hot water inlets including annular recesses;
   and a bushing seal received in each of said annular recesses and spring-urged into contact with said slide-valve;
   said slide-valve being formed with a first passageway cooperable with said two bushing seals of the two inlets, and a second passageway cooperable with said outlet, such that rotating said handle in the circumferential direction rotates said inner housing and said slide-valve to move said first passageway so as to vary the portion thereof in alignment with each of said two bushing seals, to control the mixture-proportions and temperature of the water entering said first passageway from said two inlets and passing therefrom via said second passageway to the common outlet;
   whereas pivoting said handle in the vertical direction moves said slide-valve diammetrically of said housing to vary the portion of said first passageway in alignment with either of said two bushing seals and thereby to control the flow-rate of the water passing via said first passageway and second passageway to the common outlet.

2. The mixing cartridge according to claim 1, wherein said first passageway through said slide-valve is of approximately heart-shaped configuration and is formed approximately centrally of said slide-valve.

3. The mixing cartridge according to claim 1, wherein said second passageway through said slide-valve is of approximately semi-elliptical configuration and is formed at one side of said slide-valve.

4. The mixing cartridge according to claim 1, wherein said two inlets and said two annular recesses formed in said base plate are of circular configuration and are disposed in close side-by-side relationship.

5. The mixing cartridge according to claim 1, wherein said inner housing and slide-valve include projections which prevent improper assembly of the slide-valve within said housing.

6. The mixing cartridge according to claim 5, wherein said inner housing is formed with a slot extending for part of the circumference thereof, and said outer housing is formed with a projection received in said slot for permitting only a partial rotation of said inner housing.

7. A self-contained mixing cartridge for use in hot and cold water faucets for manually selecting the mixture-proportions and flow-rates of water supplied from separate hot water and cold water inlets, comprising;

an outer housing closed at one end by a top wall formed with a central opening;
   a base plate closing the opposite end of said outer housing and having a cold water inlet, a hot water inlet adjacent to said cold water inlet, and a common outlet;
   an inner housing rotatably mounted within said outer housing;
   a lever pivotably mounted at an intermediate point to said inner housing and having an outer end projecting through said opening in said top wall of the outer housing for coupling to the handle of a faucet;
   a slide-valve within said inner housing and coupled to the inner end of said lever;
   a first annular sealing ring between said inner housing and said outer housing;
   a second annular ring between said inner housing and said slide-valve;

said cold and hot water inlets including annular recesses;

and a bushing seal received in each of said annular recesses and spring-urged into contact with said slide-valve;

said slide-valve being formed with a first passageway of approximately heart-shaped configuration formed centrally of said slide-valve and cooperable with said two bushing seals of the two inlets, and a second passageway of approximately semi-elliptical configuration formed at one side of said slide-valve and cooperable with said outlet, such that rotating said handle in the circumferential direction rotates said inner housing and said slide-valve to move said first passageway so as to vary the portion thereof in alignment with each of said two bushing seals, to control the mixture-proportions and temperature of the water entering said first passageway from said two inlets and passing therefrom via said second passageway to the common outlet;

whereas pivoting said handle in the vertical direction moves said slide-valve diametrically of said housing to vary the portion of said first passageway in alignment with either of said two bushing seals and thereby to control the flow-rate of the water passing via said first passageway and second passageway to the common outlet.

8. The mixing cartridge according to claim 7, wherein said two inlets and said two annular recesses formed in said base plate are of circular configuration and are disposed in close side-by-side relationship.

9. The mixing cartridge according to claim 7, wherein said inner housing and slide-valve include projections which prevent improper assembly of the slide-valve within said housing.

10. The mixing cartridge according to claim 9, wherein said inner housing is formed with a slot extending for part of the circumference thereof, and said outer housing is formed with a projection received in said slot for permitting only a partial rotation of said inner housing.

11. A self-contained mixing cartridge for use in hot and cold water faucets for manually selecting the mixture-proportions and flow-rates of water supplied from separate hot water and cold water inlets, comprising:

an outer housing closed at one end by a top wall formed with a central opening;

a base plate closing the opposite end of said outer housing and having a cold water inlet, a hot water inlet adjacent to said cold water inlet, and a common outlet, said two inlets formed in said base plate being of circular configuration and disposed in close side-by-side relationship; an inner housing rotatably mounted within said outer housing;

a lever pivotably mounted at an intermediate point to said inner housing and having an outer end projecting through the opening in said top wall of the outer housing for coupling to a handle of a faucet;

a slide-valve within said inner housing and coupled to the inner end of said lever;

a first annular sealing ring between said inner housing and said outer housing;

a second annular ring between said inner housing and said slide-valve;

said cold and hot water inlets including annular recesses;

and a bushing seal received in each of said annular recesses and spring-urged into contact with said slide-valve;

said slide-valve being formed with a first passageway cooperable with said two bushing seals of the two inlets, and a second passageway of approximately cooperable with said outlet, such that rotating said handle in the circumferential direction rotates said inner housing and said slide-valve to move said first passageway so as to vary the portion thereof in alignment with each of said two bushing seals, to control the mixture-proportions and temperature of the water entering said first passageway from said two inlets and passing therefrom via said second passageway to the common outlet;

whereas pivoting said handle in the vertical direction moves said slide-valve diammetrically of said housing to vary the portion of said first passageway in alignment with either of said two bushing seals and thereby to control the flow-rate of the water passing via said first passageway and second passageway to the common outlet.

12. The mixing cartridge according to claim 11, wherein said first passageway through said slide-valve is of approximately heart-shaped configuration and is formed approximately centrally of said slide-valve.

13. The mixing cartridge according to claim 11, wherein said second passageway through said slide-valve is of approximately semi-elliptical configuration and is formed at one side of said slide-valve.

14. The mixing cartridge according to claim 11, wherein said inner housing and slide-valve include projections which prevent improper assembly of the slide-valve within said housing.

15. The mixing cartridge according to claim 11, wherein said inner housing is formed with a slot extending for part of the circumference thereof, and said outer housing is formed with a projection received in said slot for permitting only a partial rotation of said inner housing.

* * * * *